United States Patent
Shepherd et al.

(10) Patent No.: US 12,515,784 B1
(45) Date of Patent: Jan. 6, 2026

(54) AERODYNAMIC FAIRING

(71) Applicant: Textron Aviation Inc., Wichita, KS (US)

(72) Inventors: Jay W. Shepherd, Derby, KS (US); Gavin Thomas Smith, Wichita, KS (US); William Dale George, Andover, KS (US); Corey Wailes Hagemeister, Wichita, KS (US); Matthew Patrick Trometer, Wichita, KS (US); Kelly Ray Laflin, Andover, KS (US); E. Rick Marickovich, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/945,644

(22) Filed: Nov. 13, 2024

Related U.S. Application Data

(60) Provisional application No. 63/598,200, filed on Nov. 13, 2023.

(51) Int. Cl.
*B64C 7/00* (2006.01)

(52) U.S. Cl.
CPC ...................... *B64C 7/00* (2013.01)

(58) Field of Classification Search
CPC ....................................................... B64C 7/00
See application file for complete search history.

(56) References Cited

U.S. PATENT DOCUMENTS

| | | | |
|---|---|---|---|
| 2009/0014583 A1* | 1/2009 | Shelton | B64C 1/22 244/137.4 |
| 2013/0094210 A1* | 4/2013 | Rice | F21V 13/04 362/245 |
| 2015/0210392 A1* | 7/2015 | Hodge | B64D 9/00 244/118.1 |
| 2016/0229536 A1* | 8/2016 | Aull | B64D 13/00 |
| 2017/0313402 A1* | 11/2017 | Flores | H01Q 1/28 |
| 2020/0385147 A1* | 12/2020 | Pursey | B64C 1/10 |

* cited by examiner

*Primary Examiner* — Ashesh Dangol
(74) *Attorney, Agent, or Firm* — Avek IP, LLC

(57) ABSTRACT

An interchangeable fairing system has a removeable fairing with a common mounting pattern for mounting onto an aircraft and aerodynamically coupling a fixed fairing structure with a fuselage structure. Different types of fairings having the common mounting pattern are interchangeable, allowing for swapping of the different fairings mounted to the aircraft.

18 Claims, 13 Drawing Sheets

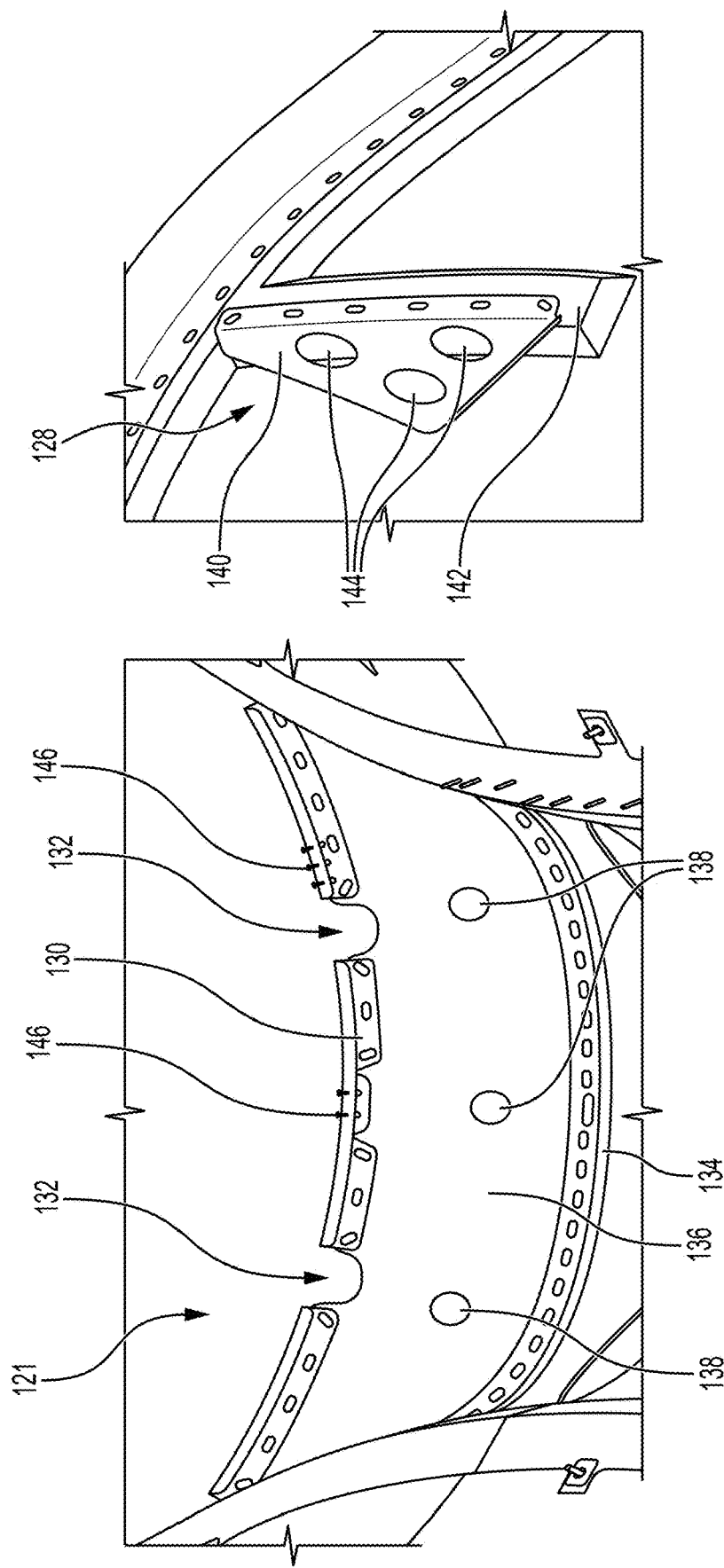

AERODYNAMIC FAIRING

CROSS-REFERENCE TO RELATED APPLICATIONS

This application claims the benefit of U.S. Provisional Patent Application No. 63/598,200, filed Nov. 13, 2023, the entire contents thereof are herein incorporated by reference.

BACKGROUND

1. Field

Embodiments disclosed herein relate generally to the field of aircraft. More specifically, the disclosed embodiments relate to aircraft fairings and radomes.

2. Related Art

It is known for an aircraft to have a fairing to house objects and systems. It is also known for an aircraft to have a radome.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In some embodiments, the techniques described herein relate to an interchangeable fairing, including: a removable fairing configured to house equipment mounted to an underside of a fuselage of an aircraft, wherein the removable fairing includes a forward portion and an aft portion; and the forward portion having an upper edge configured to attach to the underside of the fuselage of the aircraft, and the aft portion having an upper edge and an aft facing edge configured to attach to a fixed fairing structure located on the underside of the fuselage, wherein the removable fairing is configured to aerodynamically couple the fuselage to the fixed fairing structure.

In some embodiments, the techniques described herein relate to an interchangeable fairing, wherein the aft portion includes a transmissive area configured for electromagnetic signals to pass through the removable fairing.

In some embodiments, the techniques described herein relate to an interchangeable fairing including a common mounting pattern wherein a web frame, a pair of web brackets, and a plurality of drag angle attachments are positioned at common positions on the fairing such that different types of fairings having the common mounting pattern may be interchanged.

In some embodiments, the techniques described herein relate to an interchangeable fairing wherein the pair of web brackets are mounted to opposing interior sidewalls of the aft portion and configured to mount to the aircraft.

In some embodiments, the techniques described herein relate to an interchangeable fairing wherein the plurality of drag angle attachments are mounted to the upper edge of the forward portion and aft portion and configured to mount to the aircraft.

In some embodiments, the techniques described herein relate to an interchangeable fairing wherein the web frame laterally extends across the removable fairing, and the web frame is disposed between the forward portion and aft portion such that the forward portion and aft portion each mechanically couple to the web frame.

In some embodiments, the techniques described herein relate to an interchangeable fairing wherein the web frame includes one or more drag angle attachments configured to mount to the aircraft.

In some embodiments, the techniques described herein relate to an interchangeable fairing wherein the web frame includes apertures formed in an upper edge of the web frame.

In some embodiments, the techniques described herein relate to an interchangeable fairing wherein the common mounting pattern on the removable fairing enables interchangeability of the removable fairing with a second fairing, wherein the second fairing includes a different shape but retains the common mounting pattern for facile swapping with the removable fairing.

In some embodiments, the techniques described herein relate to an interchangeable fairing including a leading edge of the forward portion shaped to gradually slope away from a curvature of the fuselage structure.

In some embodiments, the techniques described herein relate to an interchangeable fairing including a landing light cutout removed from a bottom surface of the forward portion, wherein the landing light cutout aligns with a landing light disposed on the underside of the fuselage.

In some embodiments, the techniques described herein relate to an interchangeable fairing wherein the aft portion includes a cutout configured as an inlet to allow air flow into the fairing.

In some embodiments, the techniques described herein relate to an interchangeable fairing wherein the forward portion and the aft portion are each independently removable from the fuselage structure.

In some embodiments, the techniques described herein relate to a fairing system including: a mounting pattern including a plurality of drag angles disposed on a first fairing and a second fairing, the drag angles being configured to attach either of the first fairing or second fairing to an aircraft such that the first fairing and second fairing are interchangeable; the first fairing having a first aerodynamic shape to aerodynamically couple a fuselage structure with a fixed fairing structure when attached to the aircraft; and the second fairing having a second aerodynamic shape different from the first aerodynamic shape to aerodynamically couple the fuselage structure with the fixed fairing structure when attached to the aircraft.

In some embodiments, the techniques described herein relate to a fairing system wherein the first and second fairing each include a forward portion and an aft portion, wherein each portion includes a transmissive area configured for electromagnetic signals to pass through.

In some embodiments, the techniques described herein relate to a fairing system wherein the aft portion includes a body configured to aerodynamically couple the fixed fairing structure with the fuselage structure and the forward portion.

In some embodiments, the techniques described herein relate to a fairing system including a web frame disposed between the forward portion and the aft portion to join the forward portion and the aft portion together.

In some embodiments, the techniques described herein relate to a fairing system including attachment points fixed on the aircraft for attaching the forward portion, the aft portion, and the web frame to the aircraft, wherein the plurality of drag angles are disposed along edges of the forward portion, the aft portion, and the web frame and configured to align with the attachment points.

In some embodiments, the techniques described herein relate to a fairing system including a pair of web brackets disposed on an inner facing surface of the aft portion and configured to attach to fixed points on the aircraft.

In some embodiments, the techniques described herein relate to a fairing system wherein a seal is disposed along upper edges of the forward portion, the aft portion, and the web frame to seal the fairing against the aircraft.

BRIEF DESCRIPTION OF THE DRAWING FIGURES

Embodiments of the invention are described in detail below with reference to the attached drawing figures, wherein:

FIG. 7A is close-up perspective view of a web frame of the aerodynamic fairing of FIG. 1;

FIG. 7B is a close-up perspective view of a web bracket of the aerodynamic fairing of FIG. 1 and FIG. 4;

Figure 1:
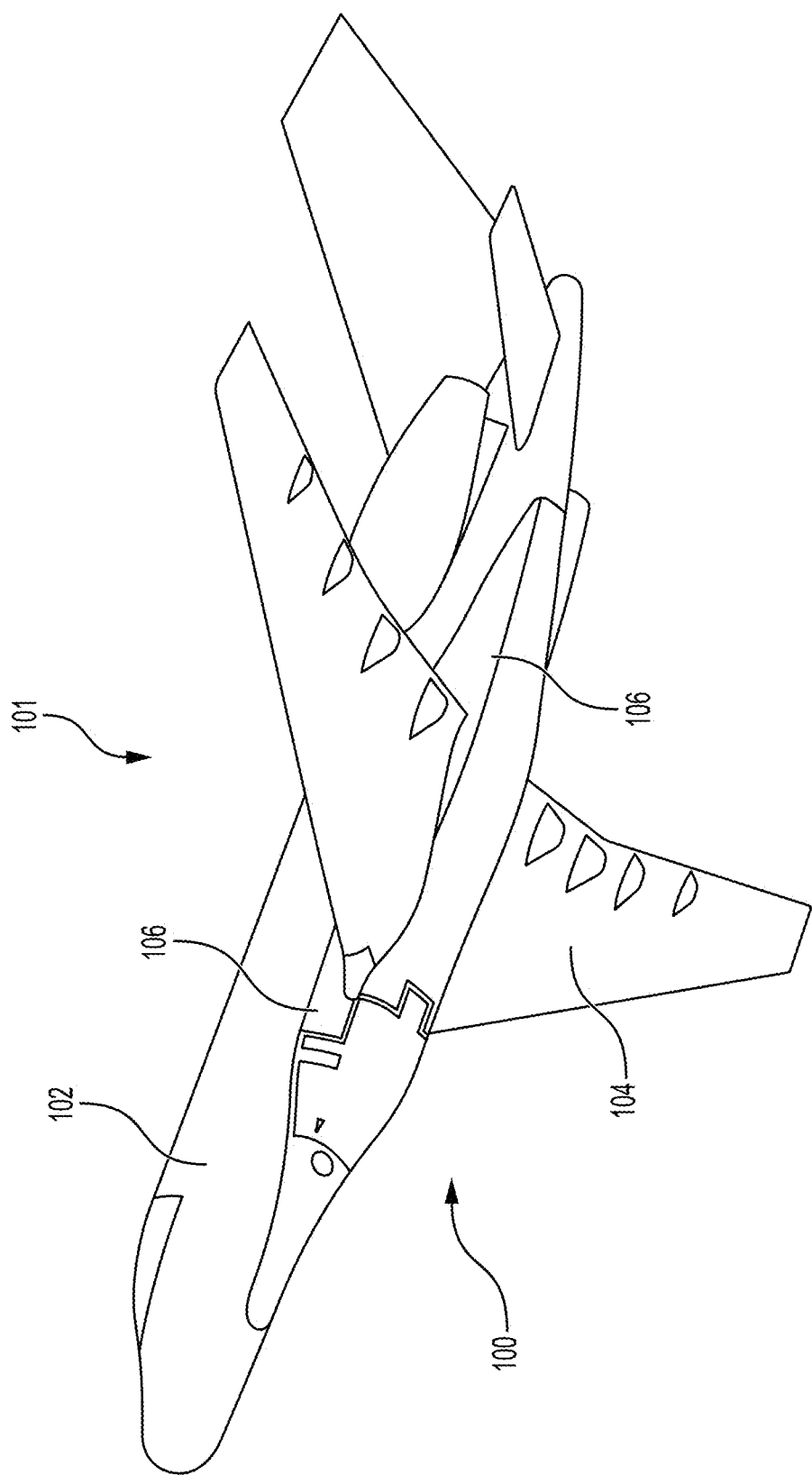
FIG. 1 is a perspective view of an aerodynamic fairing mounted to an aircraft, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

An aircraft radome is a component on the body of an aircraft configured to provide internal space to house radio or radar antennas and similar or affiliated equipment. A radome is often added as an aftermarket addition and may be referred to as a "scab-on" radome. Scab on radomes typically have a sharp angle of transition from the fuselage structure to the mounted radome which outcrops abruptly from the curvature of the fuselage. Alternatively, it may be desired to modify existing radomes for mission-specific aircraft payloads (e.g., to increase the available volume of the radome). Current arrangements are suboptimal in allowing for reconfiguration of different radomes to be used for different aircraft missions.

Aircraft fairings provide shells positioned over structural connections on an exterior surface of an aircraft. For example, fairings are commonly provided at the wing-to-fuselage connection of an aircraft. Fairings may provide reduced aerodynamic drag and/or an aesthetically pleasing appearance. A fairing is needed which is shaped to aerodynamically couple (i.e., to physically couple in an aerodynamically beneficial manner) with a fuselage structure and a fixed fairing structure while allowing for reconfiguration of different fairings to be used with different radio or radar equipment for different aircraft missions.

Embodiments disclosed herein include an interchangeable fairing configured to be installed on an exterior of an aircraft. The interchangeable fairing disclosed in embodiments is configured with a common mounting pattern providing connection means to the aircraft that are common for multiple types of fairings, enabling rapid reconfiguration between the different types of fairings to accommodate different missions. The different types of fairings may have different aerodynamic shape, designed amounts of space or other features which may be advantageous for different aircraft missions that require different types of equipment. The interchangeable fairing is configured to integrate both the fixed fairing and fuselage structures together, while substantially providing a low-drag fairing structure. The interchangeable fairing is configured so that different types of fairings may be interchanged, without altering the existing aircraft structure and without an unsightly appearance.

FIG. 1 shows a perspective view of the interchangeable fairing 100 of the fairing system attached to an aircraft 101. The interchangeable fairing 100 is configured on a lower portion of the aircraft fuselage 102 forward of the main wing 104. The interchangeable fairing 100 includes curvature with a diameter less than the aircraft fuselage 102, in embodiments, substantially allowing the interchangeable fairing 100 to extend from the curvature of the aircraft fuselage 102. The interchangeable fairing 100 includes an aerodynamically shaped forward end 110 shaped to gradually transition from the curvature of the aircraft fuselage 102 to the curvature of the interchangeable fairing 100 and aerodynamically couple the interchangeable fairing 100 and the aircraft fuselage 102 together. The interchangeable fairing 100 is configured on its aft end to aerodynamically couple to a fixed fairing 106 and on a forward end to aerodynamically couple to the fuselage 102. The fixed fairing 106 is disposed beneath where the main wing 104 is joined to the aircraft fuselage 102 and extends aft on an underside of aircraft fuselage 102. The fixed fairing 106 is aerodynamically coupled to the aircraft fuselage 102 and extends from the curvature of fuselage 102. However, the fixed fairing 106 is not intended to be interchangeable. The interchangeable fairing 100 aerodynamically couples the fixed fairing 106 and fuselage 102 structures together, but is intended to be easily removed and interchangeable with other fairings to house different equipment for accommodating different missions. What is meant by aerodynamically couple is that the fairing 100 is shaped to promote boundary layer attachment and gradual pressure gradients meaning that the fairing 100 is generally aligned with the oncoming airstream, with no sudden angular breaks or discontinuities.

Figure 2:
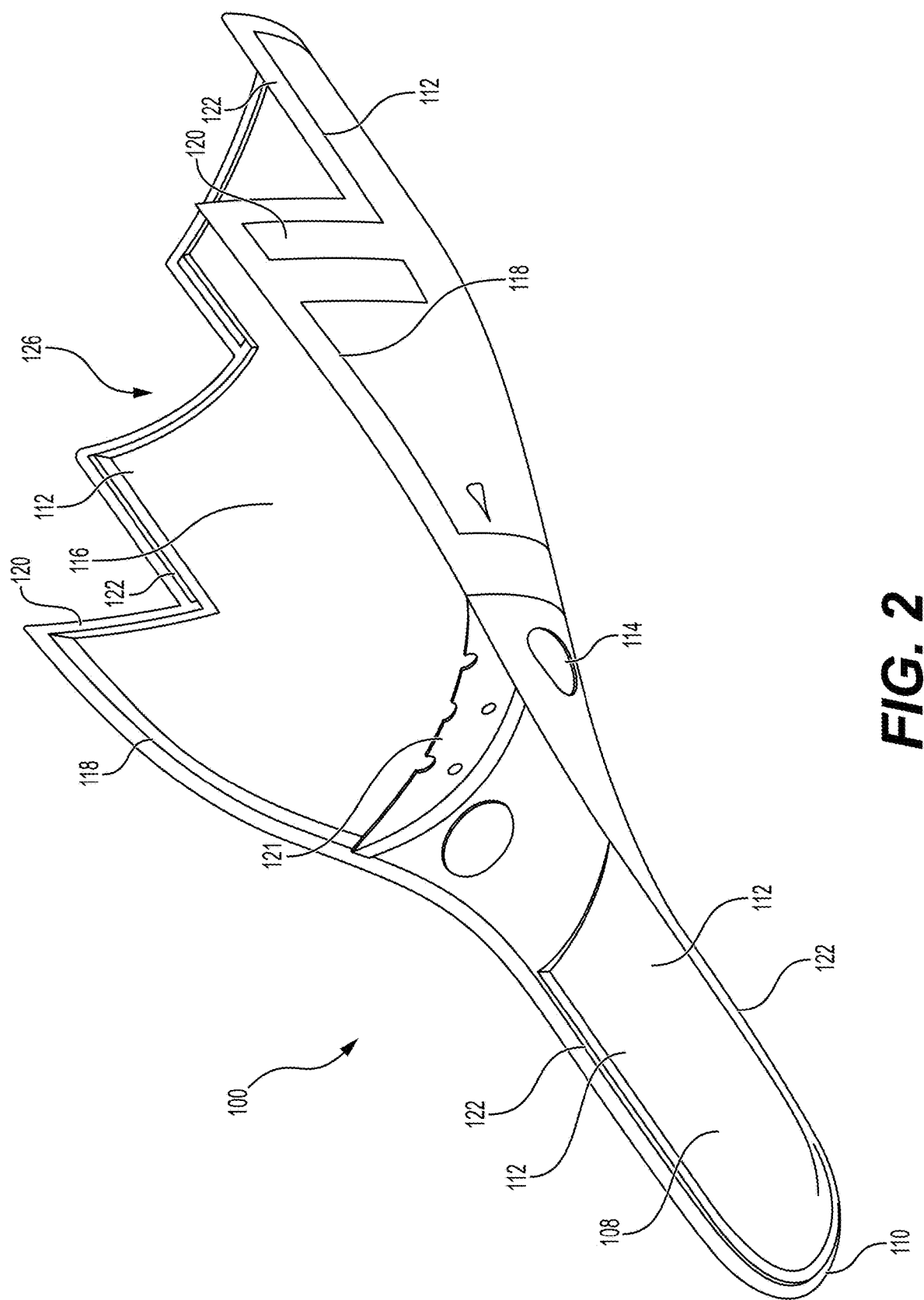
FIG. 2 is a perspective view of the aerodynamic fairing of FIG. 1.
Figure 3:
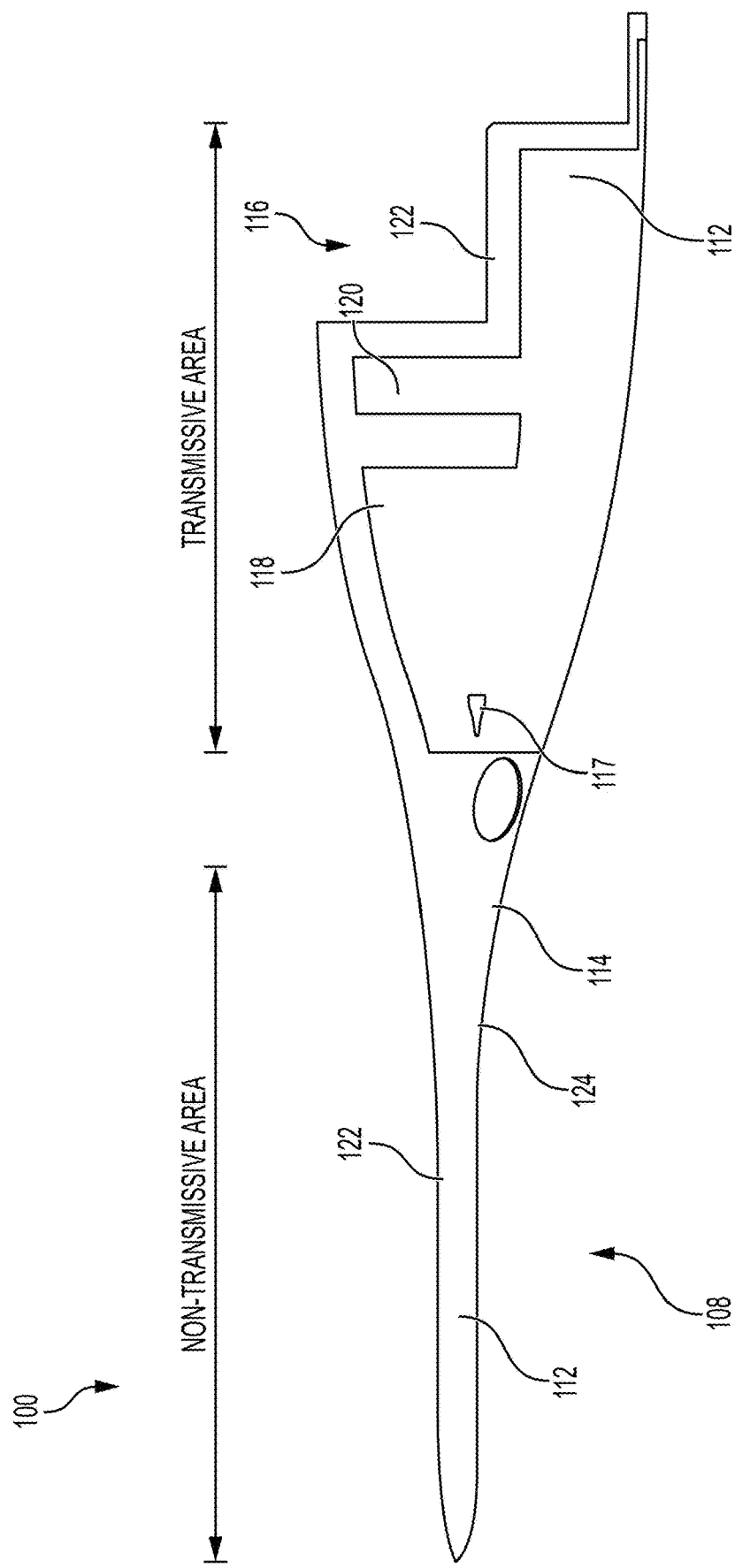
FIG. 3 is a side view of the aerodynamic fairing of FIG. 1.

FIGS. 2 and 3 show the interchangeable fairing 100 removed from the aircraft 101 body. The interchangeable fairing 100 is curved and includes a first forward portion 108 and a second aft portion 116. The forward portion 108 in embodiments and with reference to FIG. 1, is configured in a position forward of the aft portion 116 which is positioned closer to the fixed fairing 106 beneath the fuselage 102. The forward portion 108 includes a curved front end 110 which curves to opposing sidewalls 112, which are curved upwards to form the sides of the interchangeable fairing 100. The sidewalls 112 span forward and aft to form the sides of the forward portion 108 and aft portion 116 of the interchangeable fairing 100. The aft portion 116 of the interchangeable fairing 100 is curved and has a greater diameter than the forward portion 108 and allows the aft portion 116 to have a greater depth and width than the forward portion 108. The sidewalls 112 flare outwards to transition from the first diameter of the forward portion 108 to the second diameter of the aft portion 116. An upwardly raised portion 118 extends upwards from the sidewalls 112, substantially at the position when the forward portion 108 transitions to the aft portion 116. The upwardly raised portion 118 includes an aft edge 120 facing aft and defining an edge of the upwardly raised portion 118. With reference to FIG. 3, the sidewalls 112 of the interchangeable fairing 100 include an upper edge 122 which is configured to abut the fuselage 102 and the fixed fairing 106 structures. The upper edge 122 of the sidewalls 112 extends gradually upwards with the upwardly raised portion 118 such that the interchangeable fairing 100 is contoured to smoothly connect the aircraft fuselage 102 and fixed fairing 106 structures and provides an aerodynamically beneficial shape. With reference to FIG. 1, the upwardly raised portion 118 and its aft edge 120 are configured to aerodynamically couple the interchangeable fairing 100 to the fixed fairing 106 and join the aircraft fuselage 102 and fixed fairing 106 structures together. In some embodiments, the upper edge 122 includes a fluorosilicone closed-cell sponge seal with pressure-sensitive adhesive (PSA) applied to one side. The seal may substantially create a seal between the interchangeable fairing 100 and mating surfaces on the aircraft 101. The interchangeable fairing 100 includes a lower surface 124 beneath the base of the channel 126. With reference to FIG. 2, the forward portion 108 has a narrower diameter which transitions to a wider diameter at the aft portion 116. The gradual downward slope of the lower surface 124 provides for the interchangeable fairing 100 to comprise an aerodynamic shape.

In embodiments the forward portion 108 and aft portion 116 may be fabricated from a fiberglass or other composite fiber laminates and core. The composite fiber and core fabrication can allow the interchangeable fairing 100 to meet transmissivity requirements. In some embodiments, the forward portion 108 may be a non-transmissive area and the aft portion 116 may be a transmissive area. The transmissive area can substantially allow the equipment housed within fairing 100 to receive signals (possibly electromagnetic signals) while the non-transmissive area can substantially block exterior signals. In embodiments, the forward portion includes landing light cutouts 114 removed from the bottom portions of the sidewalls 112 or the lower surface 124. In embodiments, the light cutouts 114 are formed such that the beam angle created from the lights is projected forwards and downwards from the interchangeable fairing 100. With reference to FIG. 6A, a ground reception light cutout 115 may be removed from the lower surface 124 and positioned in between the landing light cutouts 114. In some embodiments, the aft portion 116 can include an inlet 117. In some embodiments, the inlet 117 may be a NACA-style inlet and can be formed into the upwardly raised portion 118 and substantially angled downwards. The inlet 117 can increase the flow of air through the fairing while minimally disturbing the aerodynamic boundary surrounding the fairing 100.

In embodiments, the interchangeable fairing 100 is approximately seventeen to approximately twenty-two feet long. In some embodiments, the interchangeable fairing 100 is approximately eighteen feet to approximately twenty feet long. In some embodiments, the forward portion 108 is approximately nine feet to approximately twelve feet long and in other embodiments is approximately ten feet and four inches to approximately ten feet and eleven inches long. In some embodiments, the aft portion 116 is approximately eight feet to twelve feet long and in other embodiments is approximately nine feet and nine inches to approximately ten feet and one inch long. In some embodiments, the forward portion 108 has a depth of approximately four inches to approximately seven inches and the aft portion 116 has a depth of approximately forty-two inches to approximately forty-eight inches. In some embodiments the depth of where the forward portion 108 transitions to the aft portion 116 is approximately fifteen inches to approximately nineteen inches. In embodiments, the forward portion 108 and aft portion 116 each are removable from the aircraft 101. For instance, either of the forward portion 108 or aft portion 116 may be independently removed from the aircraft 101. This configuration can be advantageous for removing the fairing 100 or installing components and storing equipment within the interchangeable fairing 100.

Figure 4:
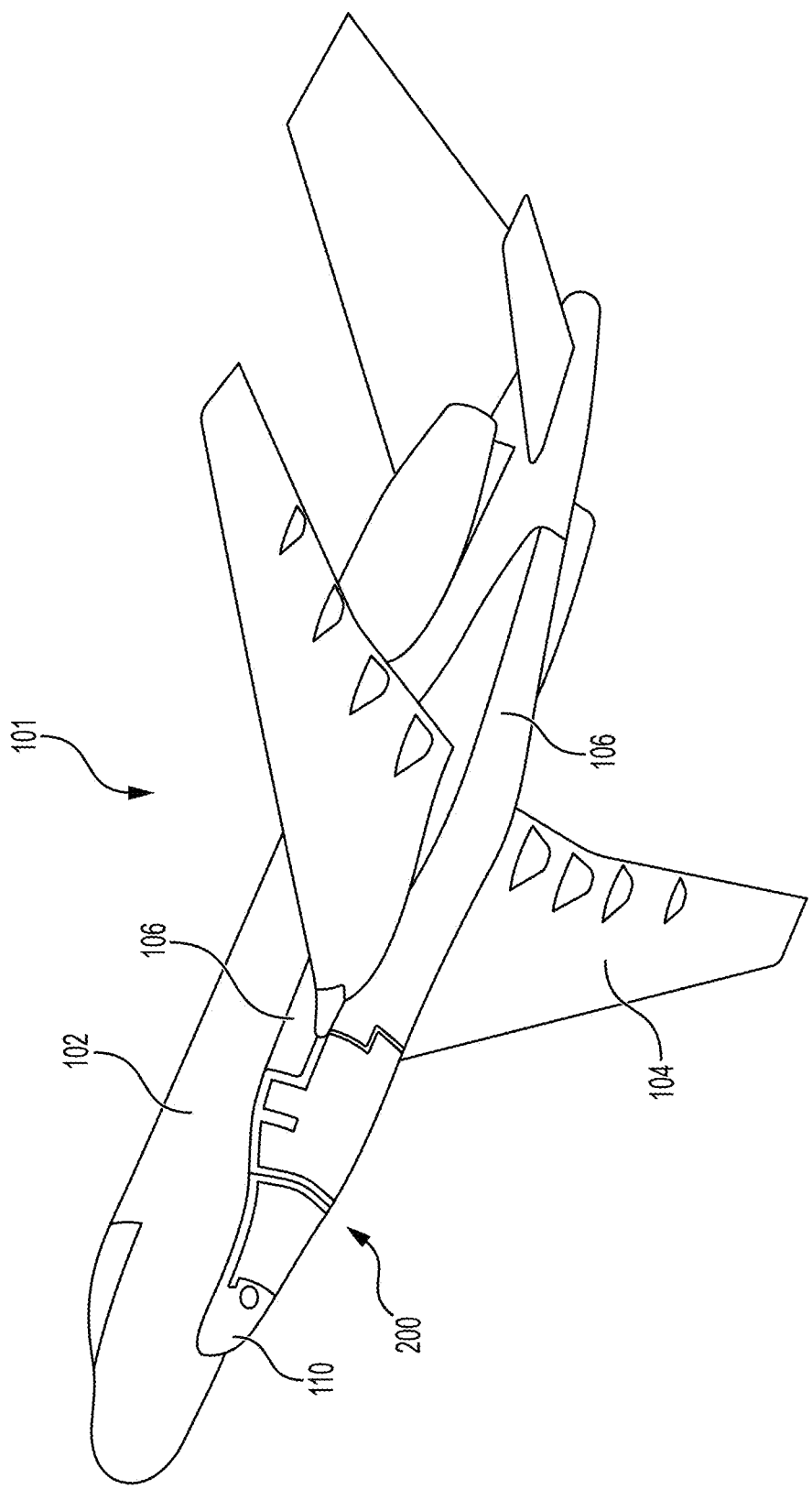
FIG. 4 is a perspective view of an alternative embodiment of an aerodynamic fairing mounted to an aircraft.

FIG. 4 shows a perspective view of an interchangeable fairing 200 attached to an aircraft 101. The interchangeable fairing 200 is an alternative embodiment of the interchangeable fairing 100. The interchangeable fairing 200 is positioned on an underside of the aircraft fuselage 102 similarly to the interchangeable fairing 100 and is outcropped from the curvature of the aircraft fuselage 102 similar to the interchangeable fairing 100. The interchangeable fairing 200 provides a greater internal volume compared to the interchangeable fairing 100. In embodiments, the interchangeable fairing 200 is approximately eleven feet to approximately fifteen feet long. In some embodiments, the interchangeable fairing 200 is approximately twelve feet to approximately thirteen feet long. In some embodiments, the forward portion 202 is approximately thirty inches to fifty inches long and in other embodiments is approximately thirty-five inches to approximately forty-five inches long. In some embodiments, the aft portion 204 is approximately eight feet to approximately eleven feet long and in other embodiments is approximately nine feet to approximately ten feet long. In some embodiments, the forward portion 202 has a depth of approximately thirty inches to approximately forty inches and the aft portion 204 has a depth of approximately forty-five inches to approximately fifty-five inches.

Figure 5:
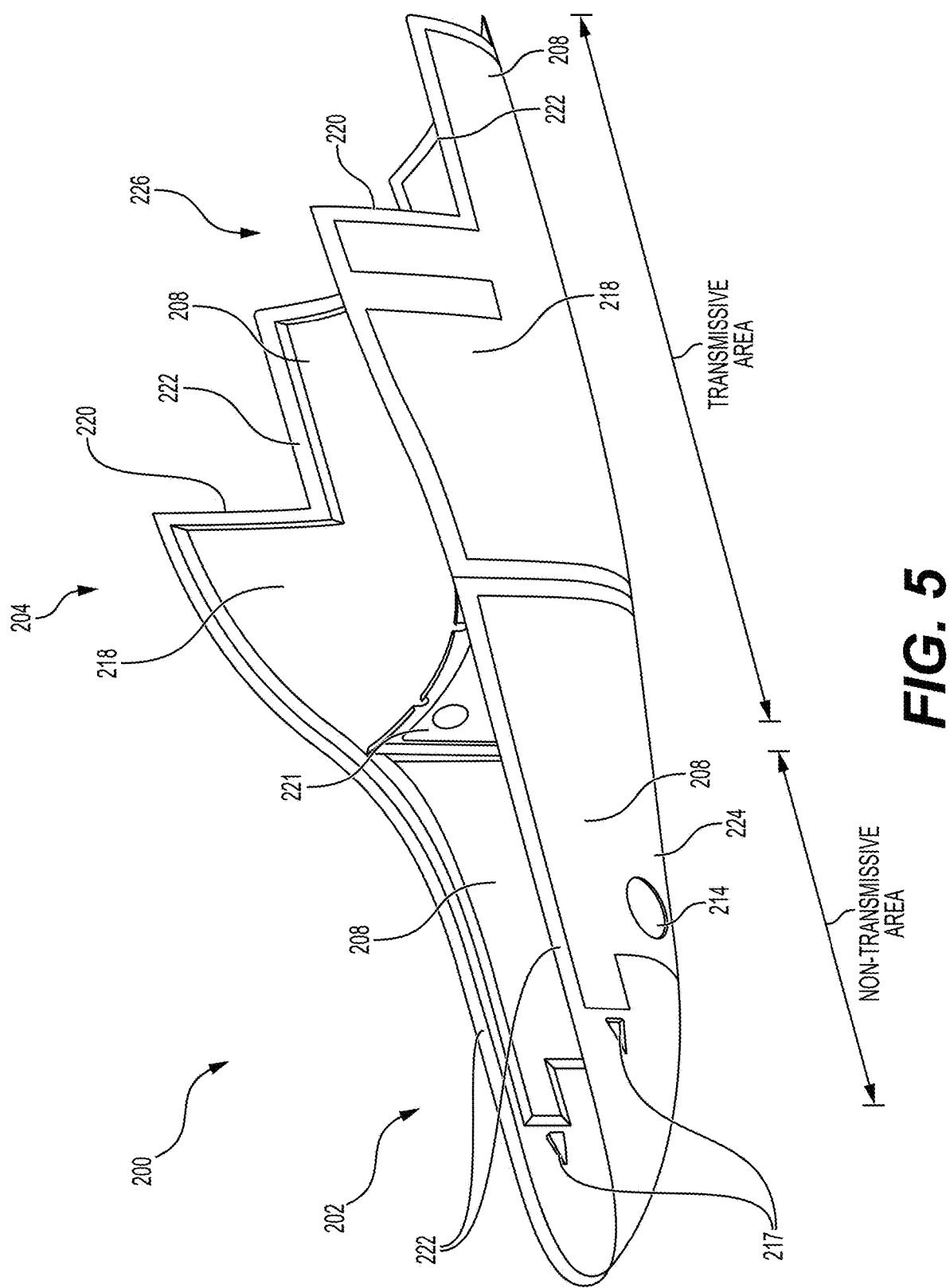
FIG. 5 is a perspective view of the aerodynamic fairing of FIG. 4.

FIG. 5 shows a perspective view of the interchangeable fairing 200 removed from the aircraft 101. The interchangeable fairing 200 includes a forward portion 202 and an aft portion 204 which each include sidewalls 208. Similar to the interchangeable fairing 100, the sidewalls 208 form the sides of the channel 226 of the forward portion 202 and aft portion 204. The aft portion 204 includes an upwardly raised portion 218 having an aft facing edge 220. The sidewalls 208 include an upper edge 222 which is configured to abut the aircraft fuselage 102 much like the upper edge 122 of the interchangeable fairing 100. In some embodiments, the upper edge 222 includes a fluorosilicone closed-cell sponge seal with pressure-sensitive adhesive (PSA) applied to one side. The seal may substantially create a seal between the interchangeable fairing 200 and mating surfaces on the aircraft 101. In embodiments, the upper edge 222 has an identical shape to the upper edge 122 enabling the two interchangeable fairings 100/200 to be interchangeable on aircraft 101. In embodiments, and similar to the interchangeable fairing 100, both the forward portion 202 and aft portion 204 can each be removed from aircraft 101.

In some embodiments, the forward portion 202 can include an inlet 217 having a similar purpose as inlet 117 configured with interchangeable fairing 100. In embodiments, the forward portion 202 and aft portion 204 may be fabricated from a fiberglass and core. The fiberglass and core fabrication can allow the interchangeable fairing 200 to meet transmissivity requirements. In some embodiments, the forward portion 202 may be a non-transmissive area and the aft portion 204 may be a transmissive area. In embodiments, the forward portion 202 includes landing light cutouts 214 removed from the bottom portions of the sidewalls 208 on the lower surface 224.

FIG. 6A shows a perspective view revealing the interior of the interchangeable fairing 100 in embodiments. The interchangeable fairing 100 includes the web frame 121 configured laterally across the channel 126 of the forward portion 108 and aft portion 116 where the diameter of the forward portion 108 begins to transition to the diameter of the aft portion 116. The sidewalls 112 of the aft portion 116 include a web bracket 128 configured on each of the sidewalls 112. Each web bracket 128 is mounted opposite one another on the sidewalls 112 such that the bracket plate is aligned laterally with the opposing web bracket 128. The web brackets 128 are used to secure the interchangeable fairing 100 to the fixed fairing 106. In embodiments, two web brackets 128 are shown, in other embodiments any number of web brackets 128 may be used to secure the interchangeable fairing 100 to the fixed fairing 106.

Figure 6B:
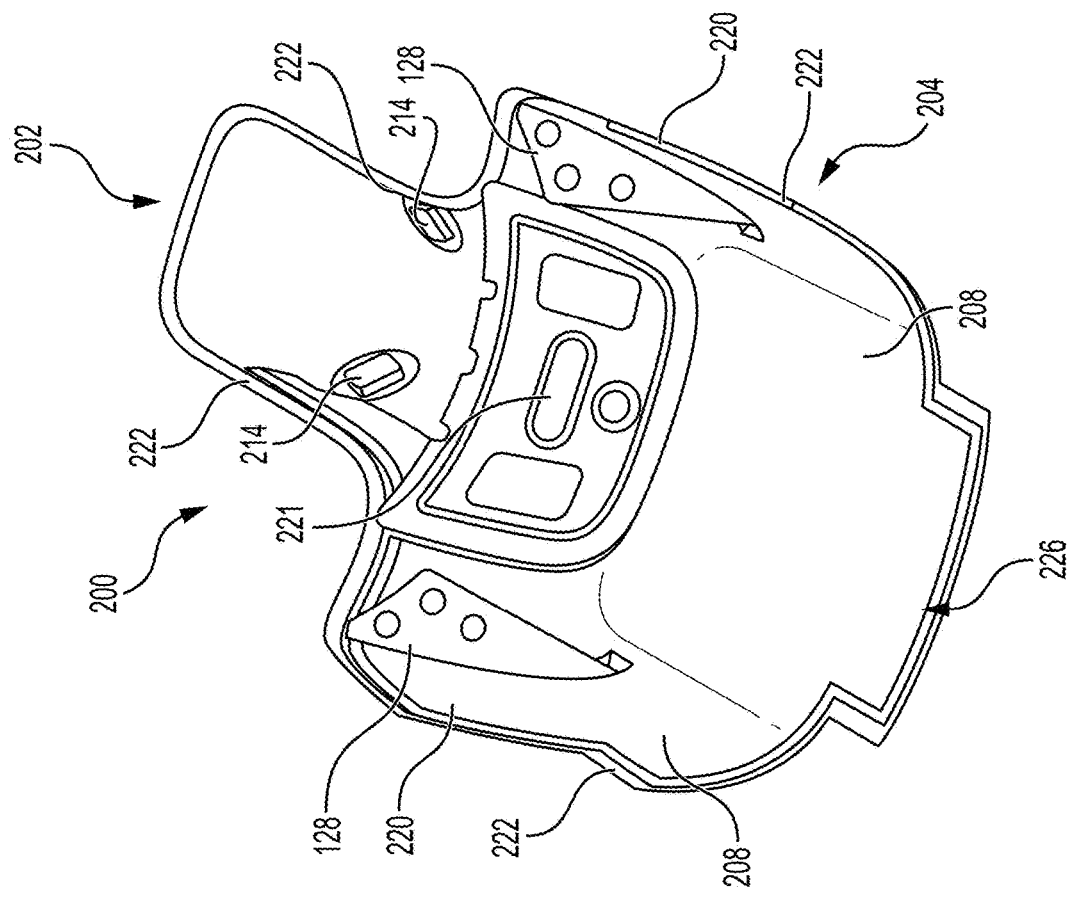
FIG. 6B is another perspective view of the aerodynamic fairing of FIG. 4.
Figure 6A:
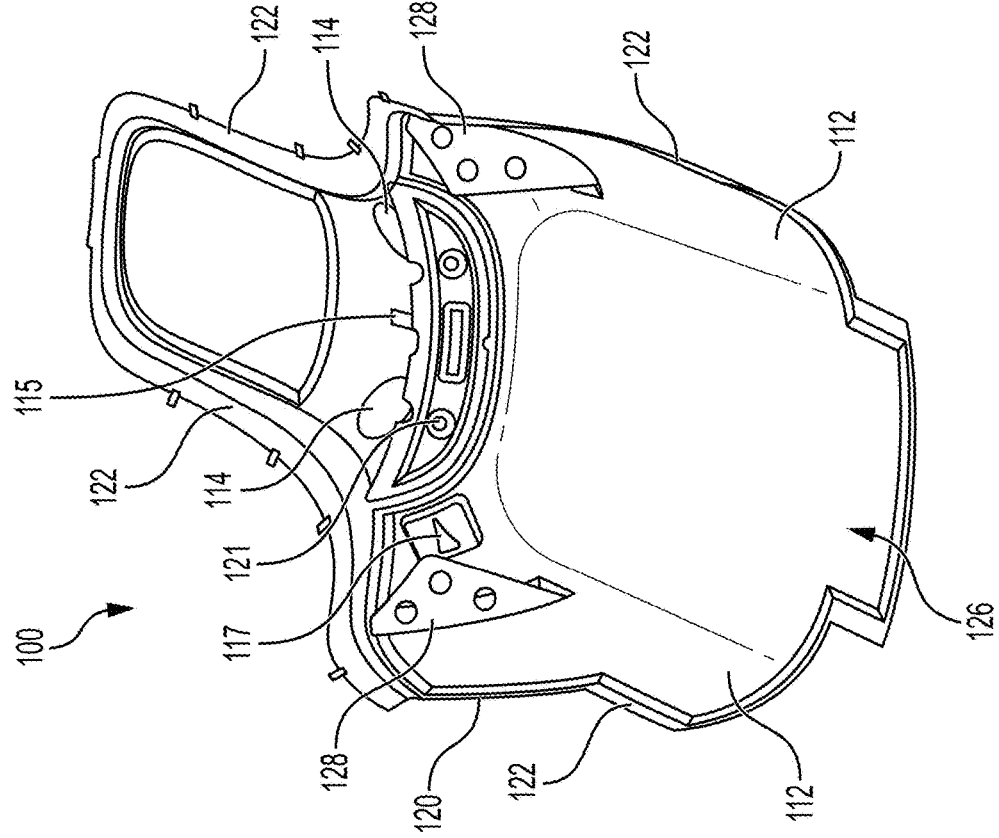
FIG. 6A is another perspective view of the aerodynamic fairing of FIG. 1.

FIG. 6B shows a perspective view revealing the interior of the interchangeable fairing 200 in embodiments. The interchangeable fairing 200 includes the web frame 221 configured laterally across the channel 126 of the forward portion 202 and aft portion 204 where the diameter of the forward portion 202 begins to transition to the diameter of the aft portion 204. Similar to the interchangeable fairing 100, the sidewalls 208 of the aft portion 204 include a web bracket 128 configured on each of the sidewalls 208. Each web bracket 128 is mounted opposite one another on the sidewalls 208 such that the bracket plate is aligned laterally with the opposing web bracket 128. The web brackets 128 are used to secure the interchangeable fairing 200 to the fixed fairing 106. In embodiments, two web brackets 128 are shown, in other embodiments any number of web brackets 128 may be used to secure the interchangeable fairing 200 to the fixed fairing 106. Note that the pair of web brackets 128 on interchangeable fairings 100/200 are in substantially the same location with respect to the aircraft 101 for mechanically coupling to the same mounting structures of the aircraft 101.

Figure 10:
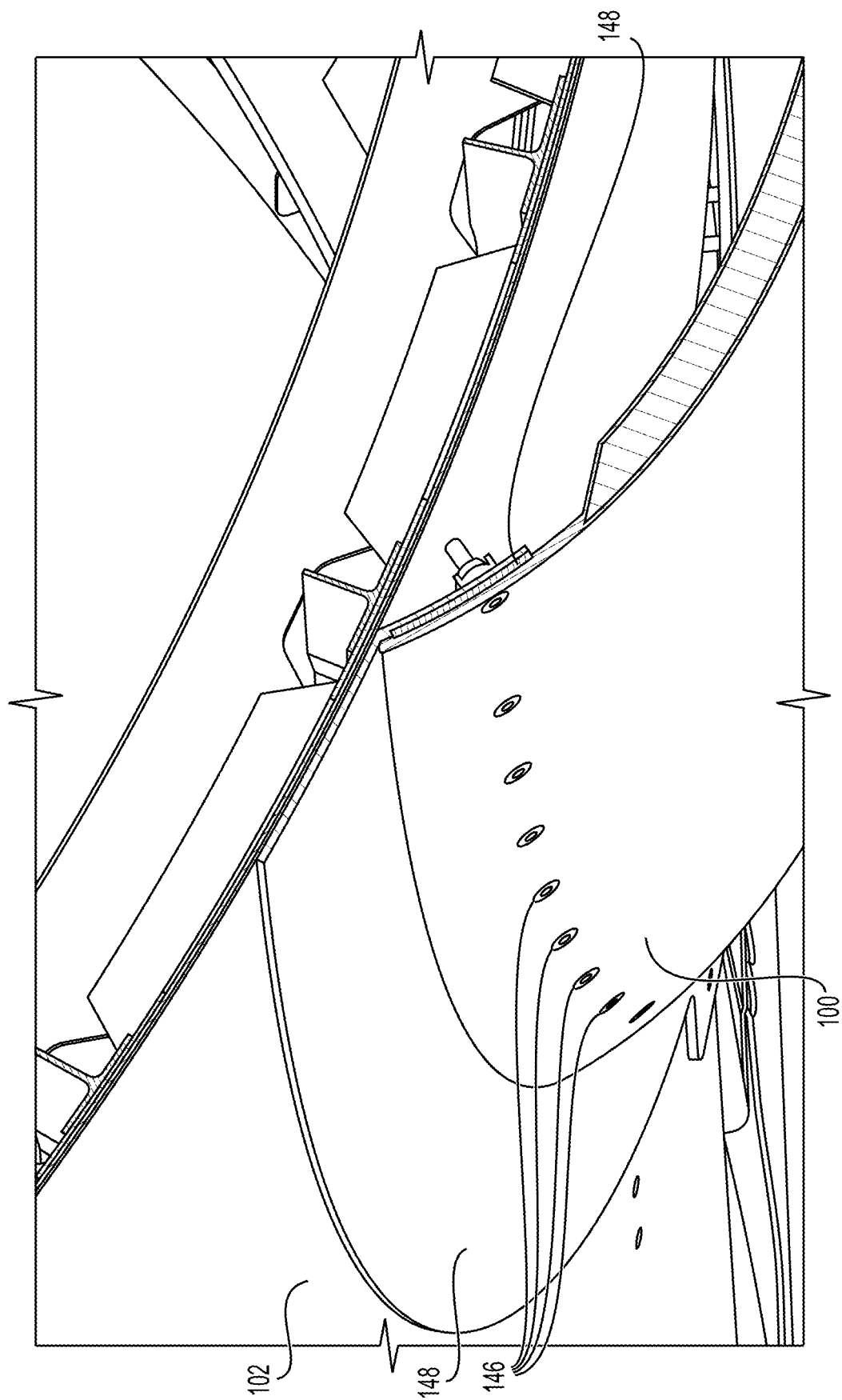
FIG. 10 is a close-up perspective view of a drag angle attachment attaching the aerodynamic fairing of FIG. 1 to a drag angle.

The web frame 121 laterally extends across the channel 126 between the forward portion 108 and aft portion 116 and substantially separates the forward portion 108 from the aft portion 116. FIG. 7A shows a close-up perspective view of the web frame 121 which extends across the channel 126 of the interchangeable fairing 100. The web frame 121 includes an upper edge 130 with slots 132 and drag angle attachments 146. In embodiments, the slots 132 are U-shaped apertures formed into the upper edge 130 and are recessed into the upper edge 130 to allow structure to pass through the web frame 121. The drag angle attachments 146 are configured to attach to drag angles 148 (see FIG. 10) fixed permanently to fuselage 102. The web frame 121 includes a lower edge 134 which is configured to mount to the channel 126 of the interchangeable fairing 100 and substantially connects the forward portion 108 and aft portion 116 structures together. In embodiments, the upper edge 130 and lower edge 134 include nut plates which fasten the web frame 121 to the interchangeable fairing 100. Between the upper edge 130 and lower edge 134 the web frame 121 includes a frame plate 136 which includes holes 138. The holes 138 in embodiments may be lightening holes to reduce the weight of the web frame 121 while also allowing for structure or systems to pass through the web frame 121. The holes 138 allow for air exchange to occur between opposing sides of the web frame 121 which may be required by Federal Aviation Administration (FAA) regulations. In embodiments, the upper edge 130 and lower edge 134, or the body of the web frame 121 may be fabricated from Aluminum which can substantially act as a lightning strike doubler. In some embodiments, the body of web frame 121 may be fabricated from a fiberglass or other composite fiber laminates and core material.

FIG. 7B shows a close-up perspective view of a web bracket 128 configured on the sidewalls 112 and sidewalls 208 of the interchangeable fairing 100 and interchangeable fairing 200. The web bracket 128 includes a mounting plate 140 configured to extend laterally away from the sidewall (i.e. 112 or 208). In embodiments, the mounting plate 140 is triangularly shaped with an edge being mounted into a recessed area 142 recessed into either the sidewalls 112 or the sidewalls 208. The mounting plate 140 includes mounting holes 144 which allow for one or more fasteners to fasten the web brackets 128 to the fixed fairing 106.

Figure 7C:
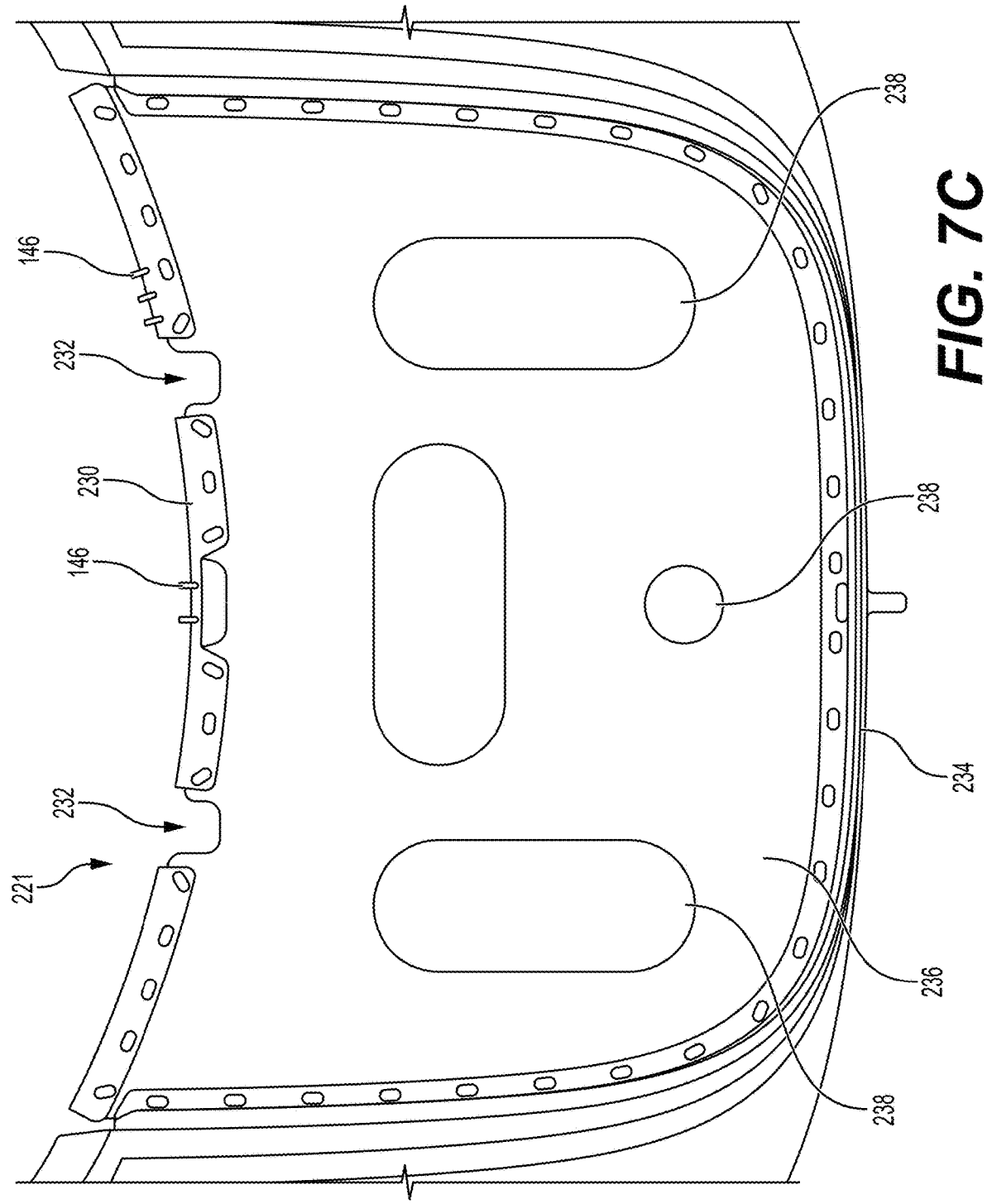
FIG. 7C is a close-up perspective view of the web frame of the aerodynamic fairing of FIG. 4.

The interchangeable fairing 200 includes a web frame 221 extending laterally across the channel 226 substantially separating the forward portion 202 from the aft portion 204. In embodiments, the web frame 221 can be fabricated from Aluminum allowing the web frame 221 to act as a lightning strike doubler. In some embodiments, the body of web frame 121 may be fabricated from a fiber glass and core material. FIG. 7C shows a close-up perspective view of the web frame 221 which extends across the channel 226 of the interchangeable fairing 200. The web frame 221 includes an upper edge 230 with slots 232 and drag angle attachments 146. Slots 232 are recessed into the upper edge 230 and allow structure to pass through the web frame 221. In embodiments, the slots 232 are U-shaped apertures formed into the upper edge 230. The drag angle attachments 146 are configured to attach to drag angles (not shown) fixed permanently to aircraft structure. The web frame 221 includes a lower edge 234 which is configured to mount to the channel 226 of the interchangeable fairing 200 and substantially connects the forward portion 202 and aft portion 204 structures together. In embodiments, the upper edge 130 and lower edge 134 include nut plates which fasten the web frame 221 to the interchangeable fairing 200. Between the upper edge 230 and lower edge 234, the web frame 221 includes a frame plate 236 which includes holes 238. The holes 238 in embodiments may be lightening holes to reduce the weight of the web frame 221 while also allowing for structure or systems to pass through the web frame 221. The holes 238 allow for air exchange to occur between opposing sides of the web frame 221 which may be required by the Federal Aviation Administration (FAA).

Figure 8A:
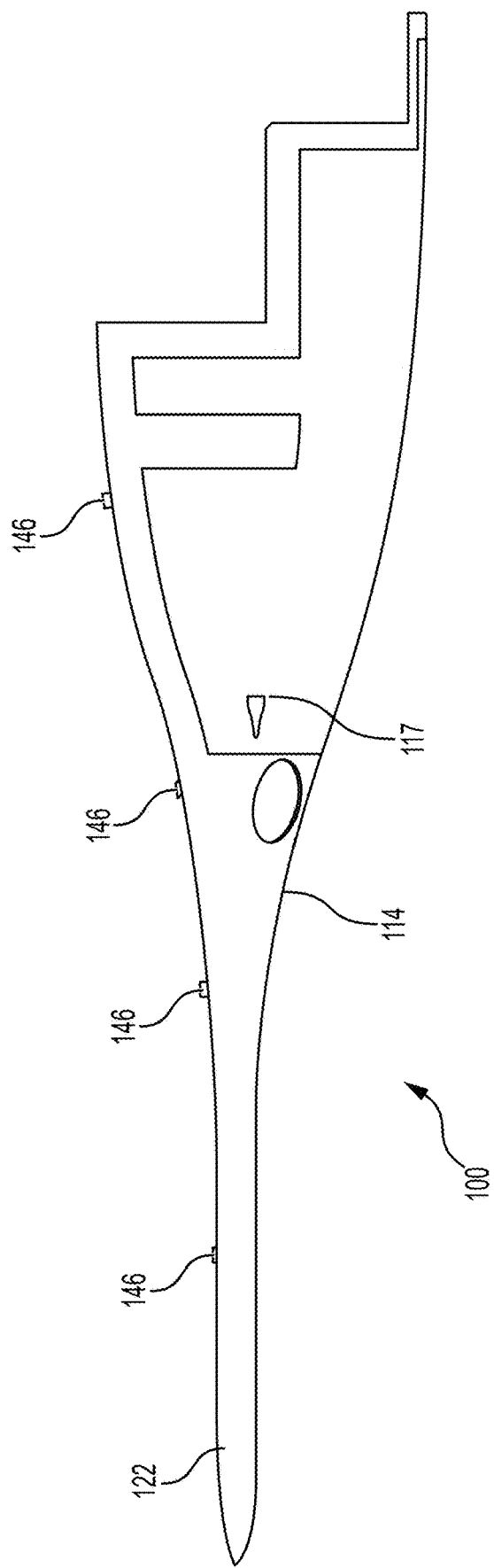
FIG. 8A is a side perspective view of the aerodynamic fairing of FIG. 1.

FIG. 8A shows a side perspective view of the interchangeable fairing 100. The interchangeable fairing 100 includes drag angle attachments 146 configured along the upper edge 122 of the sidewalls 112. The drag angle attachments 146, in embodiments, may be fabricated from carbon fiber and allow for the interchangeable fairing 100 to be mounted and secured to the aircraft fuselage 102.

Figure 8B:
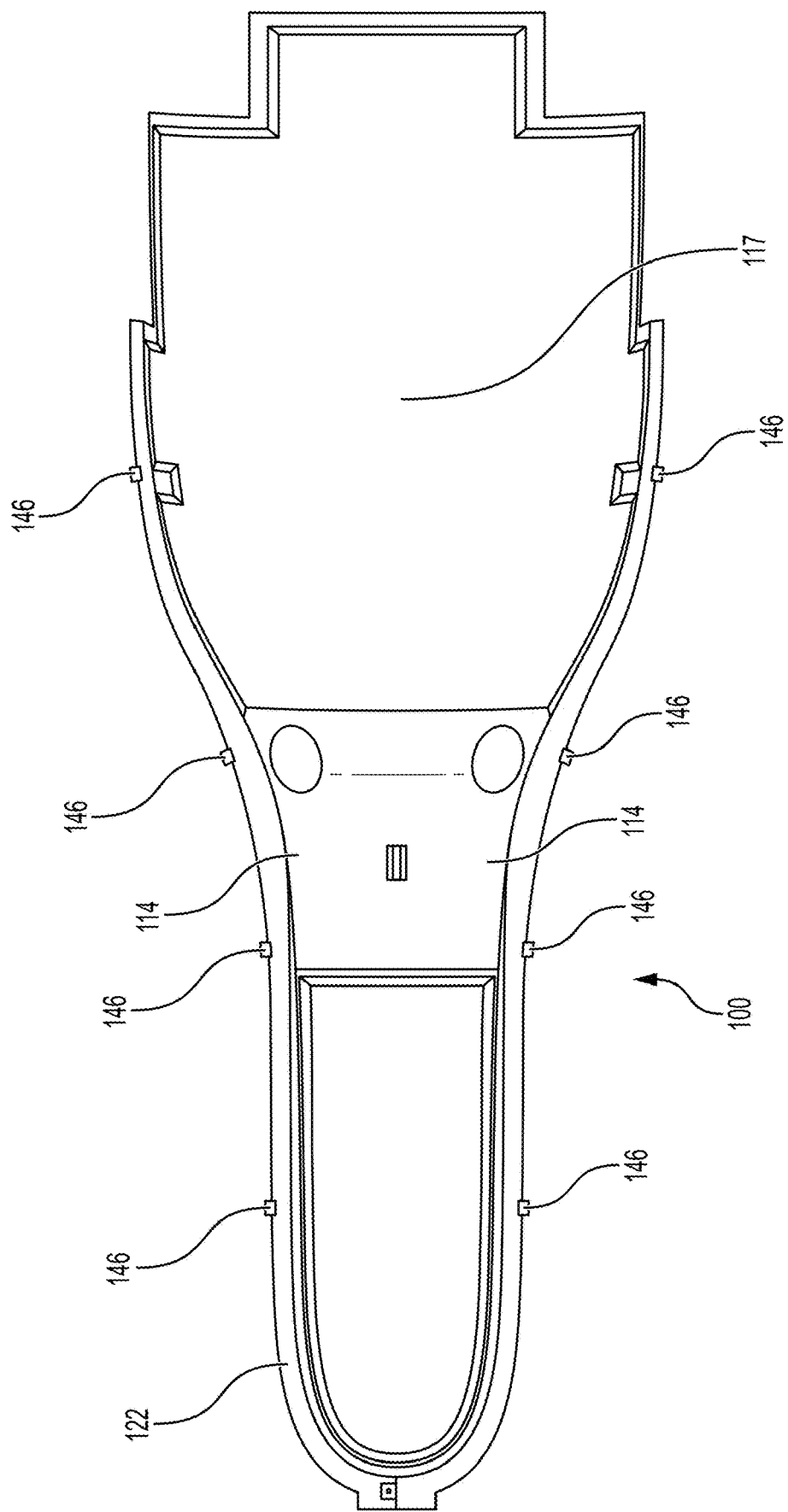
FIG. 8B is a bottom perspective view of the aerodynamic fairing of FIG. 1.

FIG. 8B shows a bottom perspective view of the interchangeable fairing 100. The interchangeable fairing 100 includes drag angle attachments 146 configured along the upper edge 222 of the sidewalls 112. The drag angle attachments 146 allow for the interchangeable fairing 100 to be mounted and secured to the aircraft fuselage 102.

Figure 9A:
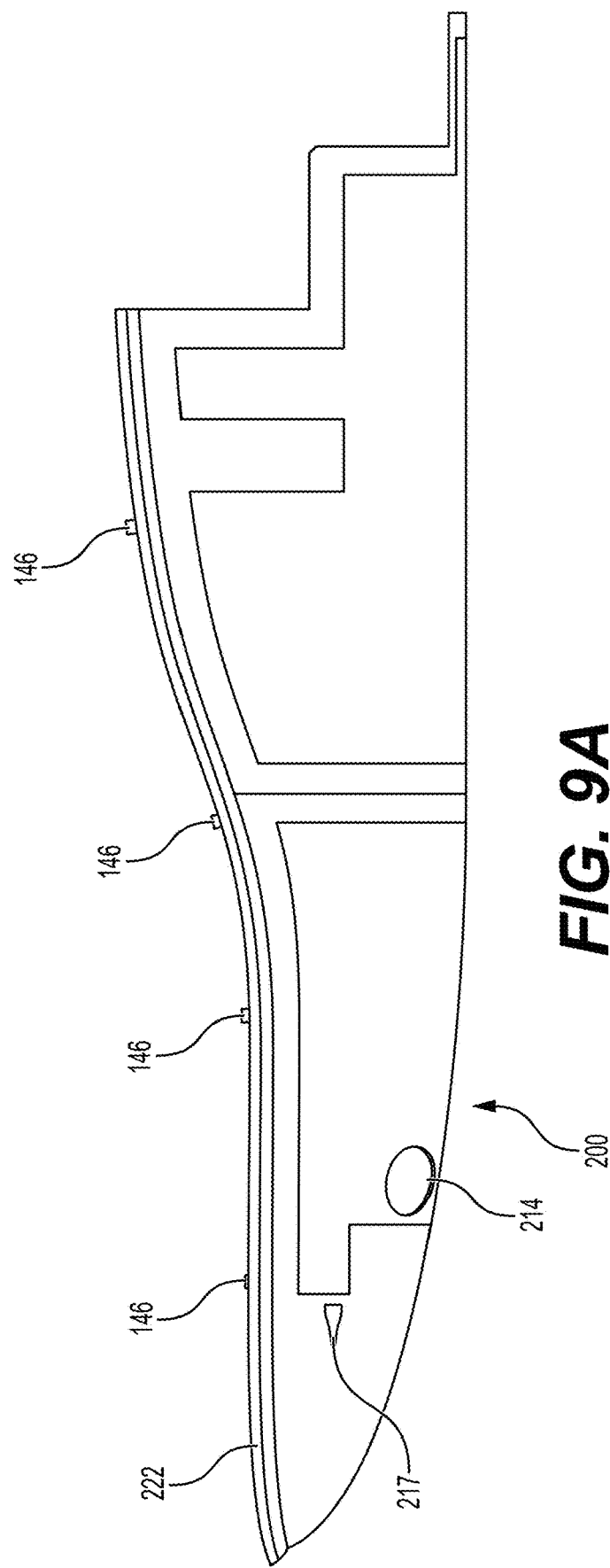
FIG. 9A is a side perspective view of the aerodynamic fairing of FIG. 4.

FIG. 9A shows a side perspective view of the interchangeable fairing 200. The interchangeable fairing 200 includes drag angle attachments 146 configured along the upper edge 222 of the sidewalls 208. The drag angle attachments 146, in embodiments, may be fabricated from carbon fiber and allow for the interchangeable fairing 200 to be mounted and secured to the aircraft fuselage 102.

Figure 9B:
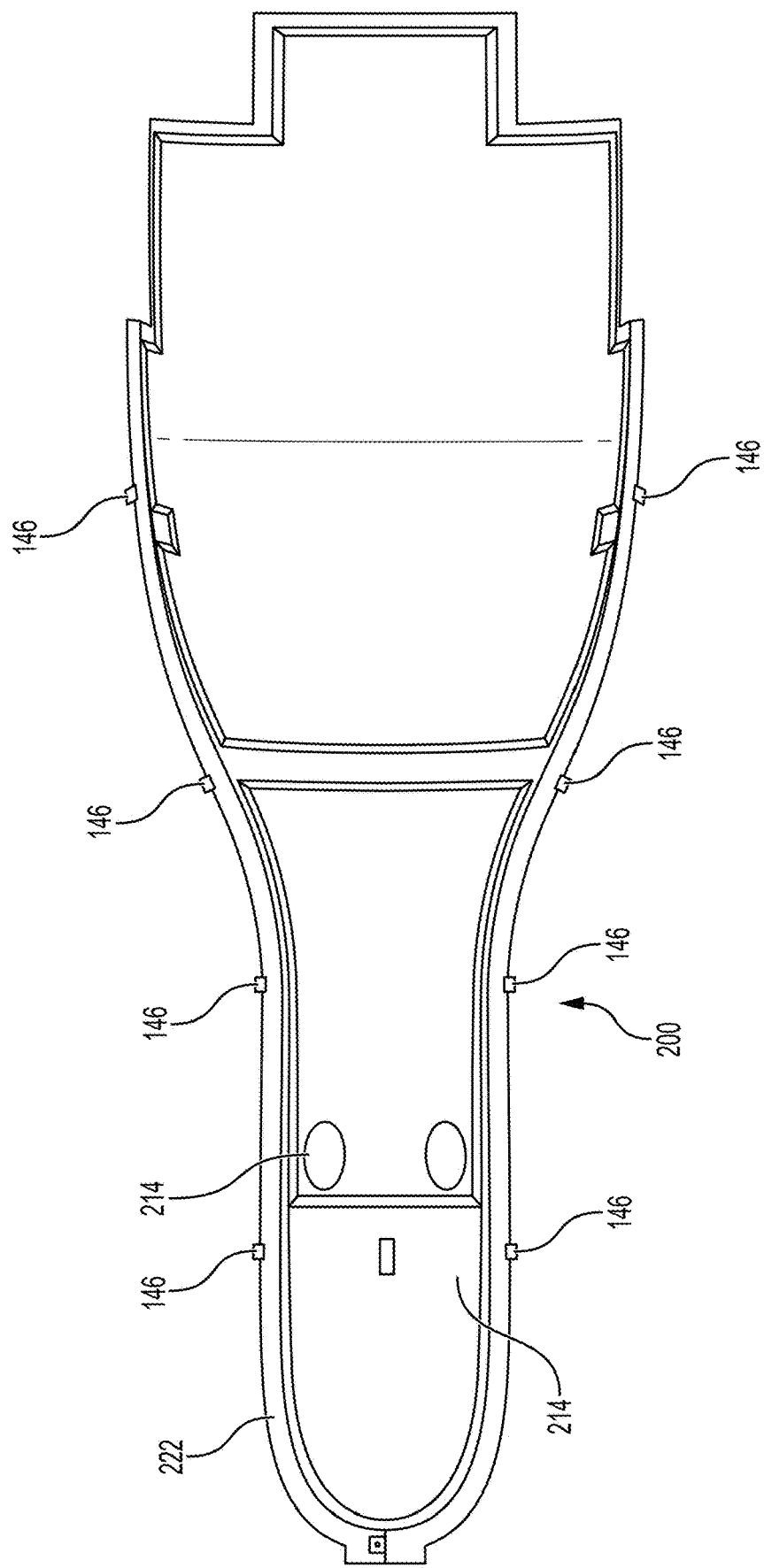
FIG. 9B is a bottom perspective view of the aerodynamic fairing of FIG. 4.

FIG. 9B shows a bottom perspective view of the interchangeable fairing 200. The interchangeable fairing 200 includes drag angle attachments 146 configured along the upper edge 222 of the sidewalls 208. The drag angle attachments 146 allow for the interchangeable fairing 200 to be mounted and secured to the aircraft fuselage 102.

With reference to FIG. 8A and FIG. 8B and FIGS. 9A and 9B the drag angle attachments 146 configured along the upper edges 122 and 222 and upper edges 130 and 230 of the web frames 121 and 221 are positioned at substantially the same forward/aft position on each respective sidewall 112 and 208. In embodiments, the drag angle attachments 146 shown in FIGS. 8A and 8B and 9A and 9B may be an attachment point for drag angles configured onto the aircraft fuselage 102. The forward/aft alignment of the drag angle attachments 146 on each of the interchangeable fairing 100 and the interchangeable fairing 200 allow for either the interchangeable fairing 100 or the interchangeable fairing 200 to be mounted to an aircraft 101 without requiring modification to the aircraft 101 structure when installing or removing either the interchangeable fairing 100 or the interchangeable fairing 200.

With reference to FIG. 6A and FIG. 6B the web brackets 128 are configured to be at substantially the same location on the sidewalls 112 and the sidewalls 208. Additionally, the web frame 121 and the web frame 221 each laterally extend across the channels 126 and 226 at substantially the same position within the interchangeable fairing 100 and interchangeable fairing 200. The alignment of the web brackets 128 on the interchangeable fairing 100 and the interchangeable fairing 200 allows for the interchangeable fairing 100 and the interchangeable fairing 200 to be interchangeable when being installed and removed on the aircraft fuselage 102 and fixed fairing 106 structure.

In embodiments, the interchangeable fairing 100 or interchangeable fairing 200 may be installed using screws common to the drag angle attachments 146 and the web brackets 128. If the interchangeable fairing 100 is being installed, the web brackets 128 and the web frame 121 are installed and if the interchangeable fairing 200 is being installed the web brackets 128 and web frame 221 are installed. In some embodiments, the web brackets 128 may have different configurations within the interchangeable fairing 100 or interchangeable fairing 200.

In operation, the interchangeable fairing 100 and interchangeable fairing 200 of the fairing system are able to be installed and removed from the aircraft fuselage 102 and fixed fairing 106. For instance, when installing the interchangeable fairing 100 or the interchangeable fairing 200 onto an aircraft fuselage 102 and fixed fairing 106, the web frame 121 or the web frame 221, the web brackets 128, and the drag angle attachments 146 are configured to secure the interchangeable fairing 100 or the interchangeable fairing 200 to mounting structures positioned on the aircraft fuselage 102 and fixed fairing 106 using screws or another type of fastener. The web frame 121, the web frame 221, web brackets 128, and the drag angle attachments 146 are positioned in substantial alignment on both the interchangeable fairing 100 and interchangeable fairing 200 allowing for the interchangeable fairing 100 and interchangeable fairing 200 to be interchangeable and compatible with the aircraft fuselage 102 and fixed fairing 106 without requiring modification to the permanent aircraft 101 structure when interchanging the interchangeable fairing 100 or interchangeable fairing 200. In some embodiments, a connection of either the interchangeable fairing 100 or interchangeable fairing 200 to the aircraft 101 may notify an avionics system which fairing 100 or 200 is installed to the aircraft 101. In this way, loft differences which exist between interchangeable fairing 100 and interchangeable fairing 200 can be accounted for by the avionics system. The interchangeability of the interchangeable fairing 100 and the interchangeable fairing 200 is advantageous, in one aspect, due to the size differences between the interchangeable fairing 100 and interchangeable fairing 200. In embodiments, the interchangeable fairing 100 has less interior space than the interchangeable fairing 200. The interchangeable fairing 100 may be installed onto the aircraft fuselage 102 and fixed fairing 106 when additional space is not required or needed for an aircraft flight. The interchangeable fairing 200 may be installed onto the aircraft fuselage 102 and fixed fairing 106 when additional storage is required for the aircraft flight. Since both the interchangeable fairing 100 and interchangeable fairing 200 are configured similarly in their attachment to the aircraft fuselage 102 and fixed fairing 106, the interchangeable fairing 100 and interchangeable fairing 200 may be interchanged for different aircraft flight missions requiring different amounts of internal space.

In some embodiments, lights may be configured on the exterior of the interchangeable fairing 100 or the interchangeable fairing 200. In other embodiments, ducts or other aircraft systems may be configured within either the interchangeable fairing 100 or the interchangeable fairing 200. In some embodiments, the interchangeable fairing 100 or 200 can be manufactured from fiberglass and core, laminate carbon fiber, or another material compatible with transmissivity requirements.

Other embodiments of the interchangeable fairing 100 and the interchangeable fairing 200 may include altering the size or shape of the interchangeable fairing 100 or the interchangeable fairing 200, which does not depart from the scope of this application.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An interchangeable fairing system, comprising:
    a removable fairing configured to house equipment mounted to an underside of a fuselage of an aircraft, wherein the removable fairing comprises a forward portion and an aft portion; and
    the forward portion having an upper edge configured to attach to the underside of the fuselage of the aircraft, and the aft portion having an upper edge and an aft facing edge configured to attach to a fixed fairing structure located on the underside of the fuselage,
    wherein the removable fairing is configured to aerodynamically couple the fuselage to the fixed fairing structure; and
    a common mounting pattern wherein a web frame, a pair of web brackets, and a plurality of drag angle attachments are positioned at common positions on the removable fairing such that different types of fairings having the common mounting pattern may be interchanged,
    wherein each web bracket of the pair of web brackets comprises a mounting plate having a substantially triangular shape with an edge configured to be received into a recessed area of a sidewall of the removable fairing.

2. The interchangeable fairing system of claim 1, wherein the aft portion comprises a transmissive area configured for electromagnetic signals to pass through the removable fairing.

3. The interchangeable fairing system of claim 1, wherein the pair of web brackets are mounted to opposing interior sidewalls of the aft portion and configured to mount to the aircraft.

4. The interchangeable fairing system of claim 1, wherein the plurality of drag angle attachments are mounted to the upper edge of the forward portion and the aft portion and configured to mount to the aircraft.

5. The interchangeable fairing system of claim 1, wherein the web frame extends laterally across the removable fairing, and the web frame is disposed between the forward portion and the aft portion such that the forward portion and aft portion each mechanically couple to the web frame.

6. The interchangeable fairing system of claim 1, wherein the web frame includes one or more drag angle attachments of the plurality of drag angle attachments configured to mount to the aircraft.

7. The interchangeable fairing system of claim 1, wherein the web frame comprises apertures formed in an upper edge of the web frame.

8. The interchangeable fairing system of claim 1, wherein the common mounting pattern on the removable fairing enables interchangeability of the removable fairing with a second fairing, wherein the second fairing comprises a different shape but retains the common mounting pattern for facile swapping with the removable fairing.

9. The interchangeable fairing system of claim 1, further comprising a leading edge of the forward portion shaped to gradually slope away from a curvature of the fuselage.

10. The interchangeable fairing system of claim 1, further comprising a landing light cutout removed from a bottom surface of the forward portion, wherein the landing light cutout aligns with a landing light disposed on the underside of the fuselage.

11. The interchangeable fairing system of claim 1, wherein the aft portion comprises a cutout configured as an inlet to allow air flow into the removable fairing.

12. The interchangeable fairing system of claim 10, wherein the forward portion and the aft portion are each independently removable from the fuselage.

13. A fairing system comprising:
    a mounting pattern comprising a plurality of drag angle attachments disposed on a first fairing and a second fairing, the plurality of drag angle attachments being configured to attach either of the first fairing or the second fairing to an aircraft such that the first fairing and the second fairing are interchangeable;
    a pair of web brackets disposed on an inner facing surface of the first fairing and the second fairing, wherein the pair of web brackets are configured to attach to fixed points on the aircraft and each web bracket of the pair of web brackets comprises a mounting plate having a substantially triangular shape with an edge configured to be mounted into a recessed area of a sidewall of the first fairing and a recessed area of a sidewall of the second fairing;
    the first fairing having a first aerodynamic shape to aerodynamically couple a fuselage structure with a fixed fairing structure when attached to the aircraft; and
    the second fairing having a second aerodynamic shape different from the first aerodynamic shape to aerodynamically couple the fuselage structure with the fixed fairing structure when attached to the aircraft.

14. The fairing system of claim 13, wherein the first fairing and the second fairing each comprises a forward portion and an aft portion, wherein each portion comprises a transmissive area configured for electromagnetic signals to pass through.

15. The fairing system of claim 14, wherein the aft portion comprises a body configured to aerodynamically couple the fixed fairing structure with the fuselage structure and the forward portion.

16. The fairing system of claim 14, further comprising a web frame disposed between the forward portion and the aft portion to join the forward portion and the aft portion together.

17. The fairing system of claim 16, further comprising attachment points fixed on the aircraft for attaching the forward portion, the aft portion, and the web frame to the aircraft, wherein the plurality of drag angle attachments are disposed along edges of the forward portion, the aft portion, and the web frame and configured to align with the attachment points.

18. The fairing system of claim 16, wherein a seal is disposed along upper edges of the forward portion, the aft portion, and the web frame to seal the first fairing and the second fairing against the aircraft.

* * * * *